Dec. 18, 1962 HANS-JÜRGEN EICKHOFF 3,069,635

FILTER ARRANGEMENT FOR VERY SHORT ELECTRO-MAGNETIC WAVES

Filed Sept. 21, 1959

Inventor
Hans-Jürgen Eickhoff
By [signature] Atty.

United States Patent Office 3,069,635
Patented Dec. 18, 1962

3,069,635
FILTER ARRANGEMENT FOR VERY SHORT ELECTRO-MAGNETIC WAVES

Hans-Jürgen Eickhoff, Tettnang, Wurttemberg, Germany, assignor to Siemens and Halske Aktiengesellschaft Berlin and Munich, a corporation of Germany Filed Sept. 21, 1959, Ser. No. 841,352
Claims priority, application Germany Sept. 26, 1958
1 Claim. (Cl. 333—9)

Figures 1, 2:
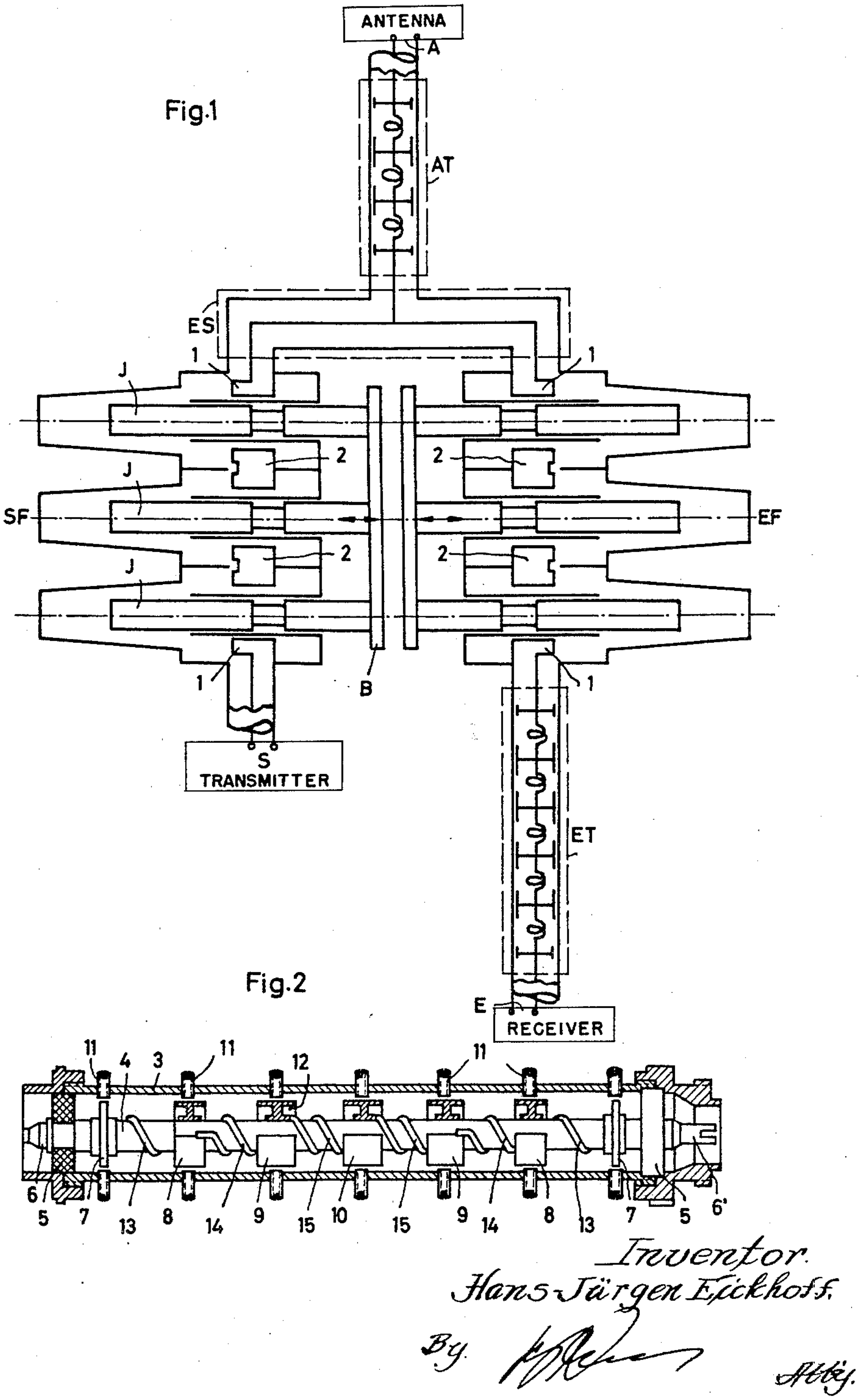

This invention is concerned with a filter arrangement for very short electromagnetic waves, comprising at least one resonance circuit having line character to which are allocated further filter means for eliminating disturbing pass bands.

For example, in directional wireless apparatus for the transmission of communications in the range of decimeter waves, there are required filters in the transmitters and receivers, the function of which is to transmit waves extended to their inputs only in predetermined frequency ranges. This is in the range of very short electromagnetic waves effected by filters built up of line resonance circuits. Such a line resonance circuit consists, for example, of a coaxial line with an electrical length amounting to one quarter of the operating wave length, wherein the inner conductor and the outer conductor are short circuited at one line end while being open at the other line end. Such line resonators suffer the drawback that they have, frequency-wise, periodically recurring pass bands. Thus, a band pass filter, built up for example of line resonators with a length, at a frequency of 500 megacycles, of one quarter of the operating wave length, will also pass frequencies the corresponding wave lengths of which amount to an odd multiple of one quarter of the wave length of 500 megacycles. In order to remedy this disadvantage, in practice, a further filter element of line resonators, having another periodicity for the individual pass bands is allocated to the line filter, in all cases in which these further pass bands can become troublesome. Both filters are then so dimensioned that they coincide with respect to a desired pass band while exhibiting different characteristics with regard to the other pass bands. However, this arrangement requires an undesirably great expenditure and is moreover difficult in regard to the dimensioning thereof. The realization of this known solution for the problems involved becomes extraordinarily complicated, particularly when it is required to provide for tuning the band pass filter through a considerable frequency range.

The object of the invention is to show a way of overcoming these difficulties.

This object is in accordance with the invention solved, in connection with a filter arrangement for very short electromagnetic waves, comprising at least one resonance circuit with line character, to which are allocated further filter means for eliminating disturbing pass bands, by the use, for the further filter means, of a low pass filter with concentrated or lumped reactance elements, whereby such further filter is with respect to its lumped reactance elements dimensioned so that the limit frequency of the low pass filter lies between the upper limit frequency of the pass bands in the line filter and the frequency-wise next higher disturbing pass bands of the line filter.

The invention and the various objects and features thereof shall now be explained with reference to the accompanying drawing, wherein—

FIG. 1 shows how the teachings of the invention can be applied in connection with the antenna gate of a transmitter-receiver installation operating with an antenna which is common to the transmitter and the receiver; and FIG. 2 shows an advantageous construction for the low pass filters.

Referring now to FIG. 1, the transmitter, receiver and antenna are for reasons of clarity merely schematically indicated by the reference character S (transmitter), E (receiver), and A (common antenna).

The transmitter S is by way of a three circuit band pass filter SF connected with the decoupling circuit ES to which is connected the receiver E by way of a further three circuit band pass filter EF and a low pass ET. The decoupling circuit ES is connected to a further low pass filter AT which forms a common connection to the antenna A.

The two band pass filters SF and EF consist respectively of three coaxial line resonators respectively coupled by means of loops 1 (coupling and decoupling) and loops 2 (intermediate coupling), such resonators being for the median frequency of the desired pass band of an electrical length of one quarter wave length. The tuning of each band pass filter is effected by shifting the inner conductor J by means of the schematically indicated actuating member B. The respective transmitter filter SF and the receiver filter EF are independently adjustable.

The low pass filter ET provided in accordance with the invention (in the receiver branch of the gate) and AT (in the antenna line) consist of concentrated or lumped elements, namely, shunt capacitances and series inductances. The elements of the low pass filters are so dimensioned that the limit frequency of the two low pass filters lies always between the highest frequency of the tuning range of both filters and the next higher disturbing pass band of the line filter.

The operation of this arrangement may be explained by recognizing that the line filter with its favorable transmission properties determines the desired pass band of the filter circuit, while the low pass filter effectively suppresses all further disturbing pass bands, since it is, owing to its construction, practically impassable for these bands.

In order to obtain a uniform behavior of the entire arrangement within a wide frequency range, for example, between 600 and 1000 megacycles, it will be advisable to construct the low pass filters AT and ET so that they exhibit Tschebyscheff behavior. Details as to such dimensioning are omitted since they are as such generally known.

FIG. 2 shows an advantageous construction for the low pass filters. Within a tubular outer conductor 3 are concentrically held between two supporting disks 5, 5' a ceramic rod 4, similar to the inner conductor of a coaxial line and terminal inner conductors 6 and 6'. Upon the ceramic rod 4 are arranged shunt capacitances 7, 8, 9 and 10 in such a manner that space remains therebetween for the placement of series inductances made in the manner of coils. The shunt capacitances designated by identical reference numerals are in the example shown assumed to be equivalent as to dimensioning and structure. The shunt capacitances 7, 8, 9 and 10 are adjustable by means of screws 11. A simple equalization is thus provided so far as manufacturing tolerances are concerned.

It has been found advantageous in practice to provide at least part of the shunt capacitances with groove-like annular recesses 12, since it is possible to obtain thereby a further increase of the blocking damping in the blocking range, above all in the range of centimeter waves. The different sizes of the recesses 12 between successive metal disks 8, 9 and 10, etc., makes it possible to obtain a different tuning of these auxiliary resonance blocks. The blocks 13, 14, 15 forming the series inductances of the low pass also have different inductivity values for reasons of the Tschebyscheff dimensioning.

To provide for a pass band of the band pass filter EF and SF of between 600 and 1000 megacycles, it was found advantageous in the use of the low pass filter shown in FIG. 2, considered from the point of view of the peripheral angle, to provide the coil 13 with a number of turns corresponding a peripheral angle of 450°, and to give the coil 14 a peripheral angle of 620° and the coil 15 a peripheral angle of 665°. In case of the correspondingly designed three-member low pass filter AT, a peripheral angle of 300° was found suitable for the two outer coils and 390° for the intermediate coil. The capacitances of the individual low pass filters were in known manner correspondingly dimensioned. These capacitances are determined by the neighboring planes of the metal disks 7, 8, 9, 10 and by the outer conductor 3.

Changes may be made within the scope and spirit of the appended claim which defines what is believed to be new and desired to have protected by Letters Patent.

I claim:

A circuit arrangement for very short electromagnetic waves comprising a transmitter, a receiver and a common antenna line, filter means comprising coaxial line sections defining a pass band interposed between said antenna line and said transmitter on the one hand and said antenna line and said receiver on the other, and low pass filters in said antenna line and between said pass band filter and receiver, each said low pass filter comprising a plurality of inductive coils and transverse capacitances arranged in a tubular line, said coils and capacitances being dimensioned for a limit frequency lying between the upper limit frequency of the pass band of the line filter and the frequency-wise next higher pass band of the line filter.

References Cited in the file of this patent

UNITED STATES PATENTS

| | | |
|---|---|---|
| 2,485,606 | Kandioan | Oct. 25, 1946 |
| 2,594,055 | Miller | Apr. 22, 1952 |
| 2,641,646 | Thomas | June 9, 1953 |
| 2,844,801 | Sabaroff | July 22, 1958 |
| 2,899,650 | Carlin | Aug. 11, 1959 |
| 2,915,716 | Hattersley | Dec. 1, 1959 |